US011993164B2

United States Patent
Marzahn et al.

(10) Patent No.: US 11,993,164 B2
(45) Date of Patent: May 28, 2024

(54) VEHICLE ON-BOARD ELECTRICAL SYSTEM HAVING A RECHARGEABLE TRACTION BATTERY DIRECTLY CONNECTED TO POWER FACTOR CORRECTION FILTER

(71) Applicant: Vitesco Technologies GMBH, Regensburg (DE)

(72) Inventors: Gabriel Marzahn, Lappersdorf (DE); Martin Götzenberger, Ingolstadt (DE); Manuel Brunner, Teunz (DE); Franz Pfeilschifter, Regensburg (DE)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 135 days.

(21) Appl. No.: 17/702,317

(22) Filed: Mar. 23, 2022

(65) Prior Publication Data
US 2022/0212553 A1 Jul. 7, 2022

Related U.S. Application Data

(63) Continuation of application No. PCT/EP2020/076463, filed on Sep. 23, 2020.

(30) Foreign Application Priority Data

Sep. 23, 2019 (DE) .......................... 102019214485.3

(51) Int. Cl.
*B60L 53/16* (2019.01)
*B60L 58/15* (2019.01)
(Continued)

(52) U.S. Cl.
CPC ................ *B60L 53/16* (2019.02); *B60L 58/15* (2019.02); *H02J 7/02* (2013.01); *H02M 1/4216* (2013.01); *H02M 7/066* (2013.01); *H02J 2207/40* (2020.01)

(58) Field of Classification Search
CPC .......... B60L 53/16; B60L 58/15; B60L 53/20; B60L 58/12; B60L 53/14; H02J 7/02; H02J 2207/40; H02J 2207/20; H02J 7/04; H02M 1/4216; H02M 7/066; H02M 1/4208; Y02T 10/70; Y02T 10/92
See application file for complete search history.

(56) References Cited

U.S. PATENT DOCUMENTS 8,922,050 B2 12/2014 Fassnacht
11,207,993 B2 * 12/2021 Pfeilschifter ............. H02J 7/02
(Continued)

FOREIGN PATENT DOCUMENTS

CN 205721151 U 11/2016
DE 102017213682 A1 2/2019
(Continued)

*Primary Examiner* — Jared Fureman
*Assistant Examiner* — Michael J Warmflash

(57) ABSTRACT

A vehicle on-board electrical system having an AC voltage charging connection, a rechargeable traction battery, which is designed as a high-voltage rechargeable battery, and a power factor correction filter. The power factor correction filter connects the AC voltage charging connection directly to the rechargeable traction battery. The operating voltage range of the rechargeable traction battery is within the output voltage range of the power factor correction filter.

11 Claims, 1 Drawing Sheet

(51) Int. Cl.
*H02J 7/02* (2016.01)
*H02M 1/42* (2007.01)
*H02M 7/06* (2006.01)

(56) References Cited

U.S. PATENT DOCUMENTS

| | | | |
|---|---|---|---|
| 2012/0229086 A1* | 9/2012 | Chi | H02J 3/1842 320/109 |
| 2012/0262113 A1* | 10/2012 | Sheu | H02J 7/02 320/109 |
| 2015/0224885 A1* | 8/2015 | Lee | B60L 53/665 320/109 |
| 2019/0245432 A1* | 8/2019 | Yan | H02M 3/33576 |
| 2019/0288539 A1* | 9/2019 | Vela Garcia | H02M 1/4216 |
| 2019/0363578 A1* | 11/2019 | Hume | H02J 7/04 |
| 2020/0313441 A1* | 10/2020 | Yang | H02J 7/0063 |
| 2022/0176838 A1* | 6/2022 | Saborido Rodriguez | B60L 53/67 |

FOREIGN PATENT DOCUMENTS

| | | |
|---|---|---|
| DE | 102018203514 A1 | 9/2019 |
| EP | 2385909 A1 | 11/2011 |

* cited by examiner

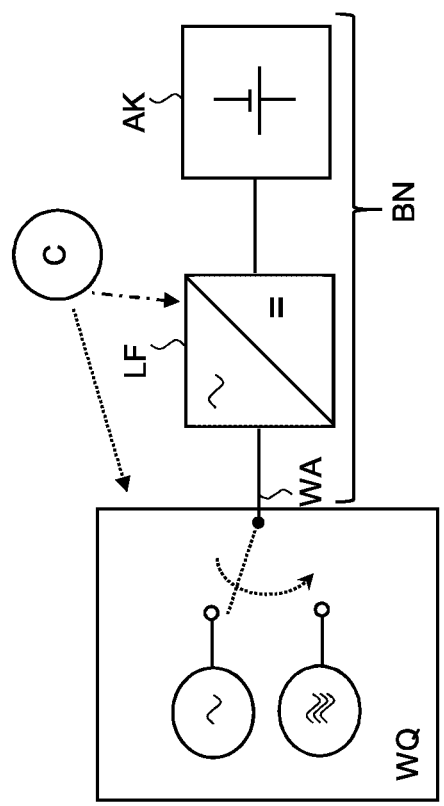

VEHICLE ON-BOARD ELECTRICAL SYSTEM HAVING A RECHARGEABLE TRACTION BATTERY DIRECTLY CONNECTED TO POWER FACTOR CORRECTION FILTER

CROSS-REFERENCE TO RELATED APPLICATIONS

This application claims priority to PCT Application PCT/EP2020/076463, filed Sep. 23, 2020, which claims priority to German Patent Application No. DE 10 2019 214 485.3, filed Sep. 23, 2019. The disclosures of the above applications are incorporated herein by reference.

BACKGROUND OF THE INVENTION

Vehicles with an electric drive, that is to say vehicles that drive purely electrically and hybrid vehicles, have a rechargeable battery. It is known to use an AC charging column to transmit electrical power to the rechargeable battery in order to charge it. A power factor correction filter is regularly used here to convert the AC voltage into DC voltage and to draw energy evenly. Since its output voltage range generally does not include the rechargeable battery voltage range, a converter which is connected to the output of the power factor correction filter via an intermediate circuit storage unit is usually additionally used to adapt the different voltage levels. Converters and intermediate circuit storage units cause a significant proportion of the manufacturing costs, the weight and the power loss of a charging device.

SUMMARY OF THE INVENTION

It is therefore an object of the invention to indicate an option using which the costs, the weight and the power loss of a charging device is reduced.

This object is achieved by the subject matter described herein. Further features, embodiments, and properties emerge from the description and the FIGURE.

It is proposed to directly connect an AC charging connection to a rechargeable traction battery via a power factor correction filter. Apart from the power factor correction filter, therefore, the circuit, starting from the AC voltage charging connection to the rechargeable traction battery, does not include a voltage converter and no further rectifier or intermediate circuit storage unit either. The power factor correction filter provides rectification and DC voltage conversion as functions. It has been recognized that further devices for voltage adjustments are not required since the power factor correction filter itself has a step-down or step-up function in addition to rectification and this is used at nominal rechargeable battery voltages that match the level of the AC voltage.

A vehicle on-board electrical system which has an AC voltage charging connection, a rechargeable traction battery and a power factor correction filter is described. The rechargeable traction battery is designed as a high-voltage rechargeable battery. The prefix "high-voltage" is used to denote components (such as the rechargeable battery) which have a nominal voltage of more than 60 volts.

The power factor correction filter connects the AC voltage charging connection directly to the rechargeable traction battery. The connection between the rechargeable battery and the charging connection is thus via the power factor correction filter. The connection between the charging connection and the power factor correction filter is a direct connection (that is to say without a voltage converter or rectifier). The connection between the power factor correction filter and the rechargeable battery is also direct (that is to say without a DC/DC converter and without a rectifier). The power factor correction filter thus connects the charging connection directly to the rechargeable traction battery since no further converter or rectifier is provided between the power factor correction filter on the one hand and the charging connection or the rechargeable battery on the other hand. Instead of the term "direct", the wording "free from DC voltage converters and rectifiers" may also be used. Although a direct connection does not include rectifiers or converters, it may, for example, include a (passive) filter or safety mechanisms such as a fuse or automatic fuse, or even a residual current protection mechanism, or even switches, relays or contactors. It is a galvanically connected connection.

The power factor correction filter is in one embodiment in the form of a Vienna filter, if the power factor correction filter is step-up, that is to say has the characteristics of a step-up converter. In addition, the power factor correction filter may be designed as a totem-pole PFC circuit. The power factor correction filter may be configured to be bidirectional or may also be designed to be unidirectional with a transmission direction from the AC voltage charging connection to the rechargeable battery. The power factor correction filter is designed with a step-down function or with a step-up function.

In an embodiment, the power factor correction filter and the AC voltage connection are each of a three-phase design.

Furthermore, the power factor correction filter may be of a three-phase (generally: multi-phase) design. With a three-phase design of both components, there may be three phase lines between the power factor correction filter and the AC voltage connection.

Use is made of a circuit topology which allows energy to be drawn from the three phases of the AC voltage connection during three-phase operation of the power factor correction filter and for this energy to be delivered at one output to the rechargeable traction battery; no galvanic isolation is used for the summation of charging currents which is necessary for this purpose. If the power factor correction filter is of a bidirectional design, the energy may flow in both directions.

The power factor correction filter is in an embodiment designed to deliver, via a DC voltage which depends on the state of charge of the rechargeable traction battery, a charging current to the rechargeable traction battery which is adjustable and is adapted by the power factor correction filter to a setpoint value, which is communicated to the power factor correction filter from outside, with an agreed tolerance. Depending on the setpoint value, different charging powers may result here.

For this purpose, a duty cycle and/or the frequency (or similar operating parameters which affect the charging current) of switching elements of the power factor correction filter may be variable. The charging current may be adjusted within a certain range. The lower limit of this range may be 0.5 A or 1 A. The upper limit results from the maximum current carrying capacity of the phases of the AC connection and the current carrying capacity or the maximum power loss of the power factor correction filter and the rechargeable traction battery.

The power factor correction filter may be designed as a step-down power factor correction filter, that is to say it may have the characteristics of a step-down converter. In addition to rectification, the power factor correction filter therefore has the function of stepping down. In the case of the power factor correction filter, there is thus in each case an (individual) inductance between the charging connection and controllable switching elements within the power factor correction filter. The individual inductances are used to buffer store small amounts of energy when stepping down. In this case, the DC voltage at the output of the power factor correction filter has a relatively narrow upper limit.

In an embodiment, the power factor correction filter is set up to deliver an adjustable charging current at an AC input voltage with a constant RMS value, specifically at a DC output voltage which lies between a minimum voltage and a maximum voltage.

A value of 50 volts is selected for the minimum voltage (related to the output voltage) of the power factor correction filter. It is essentially 50 volts, but may also be at least 80 volts or 100 volts.

The maximum voltage (related to the output voltage) of the power factor correction filter results from multiplying the (single-phase-related) grid peak value by a chaining factor (square root of 3) and another factor (0.5*square root of 3). This voltage represents the nominal upper limit that a three-phase step-down power factor correction filter may output. At a (single-phase-related) RMS value of 230 volts, it is approximately 488 volts. This maximum possible voltage may be higher or lower depending on the tolerance of the input voltages and the circuit components. Since, for example, the voltage in the European low-voltage grid may be up to 10% lower than the standard AC voltage with an RMS value of 230 volts, and circuit-related effects in the step-down power factor correction filter may cause a further reduction in the maximum possible output voltage (for example 5%), it is possible that only a rectified maximum voltage of approximately 415 V is available at the output of the power factor correction filter in the lowest case. In an embodiment, a rechargeable traction battery has a maximum voltage that does not exceed this maximum voltage of the power factor correction filter.

In an embodiment, the rechargeable traction battery may be designed to have a maximum voltage of not more than 415 volts in the fully charged state. This is achieved through the selection of the battery technology and the number of cells. The rechargeable traction battery may be a lithium battery, for example, whose number of cells is selected so that the maximum operating voltage described above is not exceeded. The number of cells refers here to cells that are connected in series.

If cells with a cell voltage range of 2.5 V . . . 4.3 V are used (for example LCO cells), then a maximum of 96 cells may be connected in series in the step-down power factor correction filter. If cells with a cell voltage range of 2.5 . . . 3.7 V are used (for example LFP cells), then a maximum of 112 cells may be connected in series. If cells with a cell voltage range of 1.3 . . . 2.9 V are used (for example LTO cells), then a maximum of 143 cells may be connected in series. Fewer cells may also be connected in series. Therefore, the rechargeable traction battery has a maximum operating voltage that is not greater than the lower limit of the maximum voltage of the power factor correction filter. The maximum operating voltage is the voltage of the rechargeable traction battery at a state of charge of 100% and a state of health (SOH) of also 100%. The number of cells connected in series may also be higher than described, and the maximum operating voltage of the rechargeable traction battery may also be higher than 415 V, for example 430 V, if one accepts that in some cases (low input voltage, unfavorable circuit tolerances of the power factor correction filter) the rechargeable traction battery may no longer be charged to a state of charge of 100%, but only to 97%, for example.

Another variant is to design the power factor correction filter as a step-up power factor correction filter, that is to say with the characteristics of a step-up converter. In addition to rectification, the power factor correction filter therefore has the function of stepping up. In the case of the power factor correction filter, there is thus in each case an (individual) inductance between the charging connection and controllable switching elements within the power factor correction filter. The individual inductances are used to buffer store small amounts of energy when stepping up. In this case, the DC voltage at the output of the power factor correction filter has a relatively narrow lower limit.

The power factor correction filter and the AC voltage connection are each of a three-phase design. The power factor correction filter includes three controllable phases that are controlled individually. Furthermore, the power factor correction filter is set up so that not all of its phases but only a subgroup thereof are active, while one or more phases are inactive. This allows, for example, the power factor correction filter to be operated in an adjustable single-phase or three-phase manner. In general, the maximum possible charging power in three-phase operation is higher than in single-phase operation.

Therefore, the power factor correction filter has individual phases, all or only a portion of which may be active. This is the case for a three-phase voltage that is applied to the AC connection and thus also at the power factor correction filter. The power factor correction filter is thus switched between single-phase and three-phase operation (while a three-phase voltage is applied to the AC voltage connection or at the power factor correction filter).

The power factor correction filter is set up to operate in single-phase operation at a state of charge of not more than 25%-40%, such as at a state of charge of not more than 30% or 33% (or else 35%) and to operate in three-phase operation at a state of charge above this limit. For this purpose, the power factor correction filter has controller that is set up to determine the state of charge and to set single-phase or three-phase operation, as mentioned. In general, the power factor correction filter may be set up for single-phase charging up to a predefined state of charge limit and for three-phase charging above this limit.

Furthermore, provision is made for the voltage of the rechargeable traction battery, which results from the sum of the (individual) cell voltages of cells connected in series, to form the criterion according to which single-phase or three-phase operation is set. The power factor correction filter is set up to operate in single-phase operation up to an average single cell voltage limit and in single-phase operation above this limit. If cells with a cell voltage range of 2.5 V . . . 4.3V are used (for instance LCO cells), then this single cell voltage limit is 3.1 V. In this case, the rechargeable traction battery is designed in such a way that approximately 210 cells are connected in series. In this case, it is irrelevant whether only one strand, which consists of such a series connection, is used or several strands, which in turn are connected in parallel to one another. If cells with a cell voltage range of 2.5 . . . 3.7 V are used (for instance LFP cells), then this single cell voltage limit is 2.9 V. In this case, the rechargeable traction battery has approximately 224 cells connected in series per strand. If cells with a cell voltage range of 1.3 . . . 2.9 V are used (for instance LTO cells), then this single cell voltage limit is 1.8 V. The rechargeable traction battery then has 361 cells which are connected in series. As mentioned above, this is based on the principle of accepting single-phase operation for approximately the lower third of the state of charge range of the rechargeable traction battery and guaranteeing three-phase operation for the upper two thirds. The number of cells connected in series may also be selected to be higher, then single-phase operation is required less often. If the cell count is chosen to be so high that the average minimum cell voltage multiplied by the number of cells connected in series results in a voltage above the minimum three-phase voltage described below, then single-phase operation is not required at all. In this case, the power factor correction filter is only used in three-phase operation. Appropriate switching devices and control components for selecting and switching the operating mode may be omitted.

The power factor correction filter may have three phases that are operated at three different phase voltages when in three-phase operation. The power factor correction filter is set up to operate only one of these phases with one phase voltage in single-phase operation or to operate several or all of the phases with the same phase voltage. The power factor correction filter may further include a section only for single-phase operation, which is active when the power factor correction filter is in single-phase operation, while the three (other) phases of the power factor correction filter are active (only) when the power factor correction filter is in three-phase operation.

The power factor correction filter is in an embodiment designed, in three-phase operation and a three-phase AC voltage, at an AC input voltage with a constant RMS value, to deliver an adjustable charging current to the rechargeable traction battery via the DC voltage, with the output voltage being able to range from a minimum three-phase voltage to a maximum three-phase voltage. The minimum three-phase voltage and the maximum three-phase voltage are each DC voltages. The prefix "three-phase" refers to all three phases of the power factor correction filter being active or the power factor correction filter being in three-phase operation.

The minimum three-phase voltage of the power factor correction filter is obtained by multiplying the (single-phase-related) grid peak value by a chaining factor (square root of 3). This voltage represents the nominal lower limit that a three-phase step-up power factor correction filter may output. At a three-phase input voltage with a (single-phase-related) RMS value of 230 volts and a single-phase grid peak value of 325 volts, it is nominally approximately 563 V. This minimum possible voltage may be higher or lower depending on the tolerance of the input voltages and the circuit components. Since, for example, the voltage in the European low-voltage grid may be up to 10% higher than the standard AC voltage with an RMS value of 230 volts, and circuit-related effects in the step-up power factor correction filter may cause a further increase in the minimum possible output voltage (for example 5%), it is possible that no lower rectified voltage than approximately 650 V is available at the output of the power factor correction filter in the highest case. In an embodiment, the rechargeable traction battery is designed in such a way that three-phase operation is not required below approximately 650 V.

The maximum three-phase voltage is, for example, 1500 volts, essentially 800 volts, 900 volts or essentially 1000 volts, but may also be more than 1400 volts or 1500 volts. In configurations of the vehicle on-board electrical system, the maximum three-phase voltage is essentially 800 or 850 volts or 900 volts. An upper limit of 1500 volts may be provided for the maximum three-phase voltage.

The power factor correction filter is set up to generate an adjustable charging current into the rechargeable traction battery at a DC output voltage that spans the range between the minimum three-phase voltage and the maximum three-phase voltage. The rechargeable traction battery may in this case be a lithium rechargeable battery, for example, with the number of cells connected in series being more than 192. The number of cells may be approximately 210, for example, if the cells have a cell voltage range of 2.5 V ... 4.3 V (for instance with LCO cells). The number of cells may be approximately 224, for example, if the cells have a cell voltage range of 2.5 V ... 3.7 V (for instance with LFP cells). The number of cells may be approximately 361, for example, if the cells have a cell voltage range of 1.3 ... 2.9 V (for instance with LTO cells). The number of cells always refers here to serially connected cells. Higher cell counts may also be used. The upper limit for the number of cells results from the maximum three-phase voltage divided by the cell voltage at 100% state of charge. This upper limit may also be exceeded if one accepts that in some cases (unfavorable coincidence of tolerances, see above) the rechargeable traction battery may no longer be charged to a state of charge of 100%, but only to 97%, for example.

The power factor correction filter is in an embodiment also designed for single-phase operation. The power factor correction filter is designed, in single-phase operation, to deliver a charging current to the rechargeable traction battery, which charging current may be set, namely at a DC voltage starting from a minimum single-phase voltage up to a maximum single-phase voltage. The minimum and maximum voltages are DC voltages. The prefix "single-phase" refers to only one phase of the power factor correction filter being active or the power factor correction filter being in single-phase operation. The minimum single-phase voltage of the power factor correction filter results from the grid peak value of the AC input voltage. This voltage represents the nominal lower limit that a single-phase step-up power factor correction filter may output. This results in a minimum single-phase voltage of 325 volts for a (single-phase-related) RMS value of 230 volts. The minimum possible voltage may be higher or lower depending on the tolerance of the input voltage and the circuit components. Since, for example, the voltage in the European low-voltage grid may be up to 10% higher than the standard AC voltage with an RMS value of 230 volts, and circuit-related effects in the step-up power factor correction filter may cause a further increase in the minimum possible output voltage (for example 5%), it is possible that no lower rectified voltage than approximately 375 V is available at the output of the power factor correction filter in the highest case. The rechargeable traction battery is therefore designed in such a way that it never has a voltage below this limit. The number of cells connected in series must therefore be at least 150 in the step-up power factor correction filter if the cells have a cell voltage range of 2.5 V ... 4.3 V (for instance LCO cells) or 2.5 V ... 3.7 V (for instance LFP cells). The number of cells must be at least 289 if the cells have a cell voltage range of 1.3 ... 2.9 V (for instance LTO cells). The number of cells always refers here to serially connected cells. The cell voltage range always means the voltage range in which the cells should be able to be operated and charging should be possible. The cell voltage in this case is the average cell voltage of the cells connected in series. Individual cells of the serially connected strand may deviate above or below this.

In embodiments, the minimum single-phase voltage is at least approximately 276 volts, 325 volts, or at least 375 volts, or even at least 410 volts. In an embodiment, the minimum single-phase voltage may be substantially 350 volts, 370 volts, 390 volts or 410 volts.

The maximum single-phase voltage is in an embodiment not less than 480 volts, 550 volts or 650 volts. Furthermore, the minimum single-phase voltage may be 700 volts, for example. The maximum single-phase voltage may be at least as great as 100%, 105%, 110%, or 120% of the minimum three-phase voltage.

A comparable embodiment provides that the power factor correction filter for three-phase operation has a voltage range that overlaps with the voltage range in single-phase operation. As a result, a voltage band which ranges from the single-phase minimum voltage to the three-phase maximum voltage is generated, by switching over the operation or the number of active phases and by appropriate control of the power factor correction filter. In an embodiment, the power factor correction filter is set up to cover a voltage range that extends from the minimum single-phase voltage to the maximum three-phase voltage in different operating modes (single-phase and three-phase).

The vehicle on-board electrical system also includes a controller. The controller is connected to the power factor correction filter in a driving manner. The controller is set up to adjust the operation of the power factor correction filter, that is to say to switch the power factor correction filter from single-phase operation to three-phase operation (or vice versa). The controller is set up to perform this switching when a terminal voltage at the rechargeable traction battery reaches the minimum three-phase voltage.

In the case of a step-down power factor correction filter, the operating voltage of the rechargeable traction battery at a state of charge of 100% is below the maximum voltage of the power factor correction filter. For the operating voltage of the rechargeable traction battery at a minimum state of charge of not more than approximately 10%, it is the case that this is greater than the minimum voltage of the power factor correction filter.

For a step-up power factor correction filter, an empty rechargeable traction battery (such as a rechargeable battery with a state of charge of 1%, 5%, 10% or 20%) results in a voltage that is greater than the minimum single-phase voltage of the power factor correction filter, with the result that adjusting the number of phases results in a suitable voltage, even with a minimum state of charge, at which the charging current is delivered to the rechargeable traction battery. With a minimum state of charge of not more than 10%, the rechargeable traction battery therefore has an operating voltage which is greater than the minimum single-phase voltage of the power factor correction filter. The full rechargeable traction battery has a voltage that is lower than the maximum three-phase voltage of the power factor correction filter.

The AC voltage charging connection is designed as a plug-in connection device, which in an embodiment is a socket. The charging connection may have several contacts, for AC voltage phases (for example three). In addition, the charging connection may have a contact for a neutral conductor. The charging connection is standardized according to a standard for wired charging of electric vehicles.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

FIG. 1 is used to illustrate a vehicle on-board electrical system that is connected to an AC power source.

DETAILED DESCRIPTION OF THE PREFERRED EMBODIMENTS

The following description of the preferred embodiment(s) is merely exemplary in nature and is in no way intended to limit the invention, its application, or uses.

FIG. 1 shows an AC power source WQ and a vehicle on-board electrical system BN. The vehicle on-board electrical system BN includes an AC voltage charging connection WA, a power factor correction filter LF and a rechargeable traction battery AK. It is seen that the power factor correction filter LF is directly connected to the rechargeable traction battery AK. It is also seen that the AC voltage charging connection WA of the vehicle on-board electrical system BN is directly connected to the power factor correction filter. The power factor correction filter LF includes an AC voltage side that is directly connected to the AC charging connection WA. The power factor correction filter LF also includes a DC voltage side that is directly connected to the rechargeable traction battery AK.

It is shown that the AC voltage connection WA is connected to an AC voltage source WQ. The AC voltage charging connection WA is of a three-phase design. The power factor correction filter LF includes three phases which are activated individually by the controller C, as represented by the arrow shown in dotted lines. Thus, in a three-phase state, all three phases of the power factor correction filter LF are operating. In single-phase operation, only one of the phases of the power factor correction filter LF is operating or several phases are operating synchronously or with the same phase of the AC voltage connection WA. These two modes of operation are represented by using the AC voltage source WQ as a single-phase or as a three-phase source. The representation is not intended to indicate that the AC voltage source WQ itself may be switched between single-phase and three-phase operation; instead, the single-phase or three-phase operation in which one or three phases of the AC voltage source WQ are used is shown through controlling the power factor correction filter. In fact, the switch is implemented within the power factor correction filter or within the controller C, which may activate or deactivate the individual phases of the power factor correction filter LF.

Since the basic activation or deactivation of individual phases of the correction filter is controlled by the controller and implemented by the power factor correction filter, the representation with the dotted arrow is purely symbolic; in fact, the number of phases is defined by a control signal output by the controller C to the power factor correction filter LF. However, since the use of the AC voltage source WQ as a single-phase or three-phase source is set by the control, this symbolic control assignment, which is not to be understood as an implementation, is selected in the symbolic representation of FIG. 1.

FIG. 1 shows an example in which the power factor correction filter is implemented as a step-up filter. In this case, at relatively low rechargeable traction battery voltages (that is to say with a comparatively low state of charge), first the single-phase operation is selected and as the voltage of the rechargeable battery AK increases (that is to say with a comparatively increasing state of charge), three-phase operation is selected. Since the voltage ranges in single-phase and three-phase operation overlap in the step-up power factor correction filter LF, there is continuous voltage carrying on the DC voltage side of the power factor correction filter LF. In the case of a step-down power factor correction filter, only three-phase operation would result and therefore also no driving by the controller C, with which single-phase operation could be set.

The dot-dash arrow shows that the controller also drives the controllable switching elements of the power factor correction filter LF and may therefore generate the output of a charging current on the DC voltage side of the power factor correction filter LF (at a constant RMS voltage on the AC side). This further control intervention is available both for step-up and step-down power factor correction filters. The charging current of the power factor correction filter LF, which is output to the rechargeable traction battery AK on the DC voltage side of the power factor correction filter LF, is also adjusted by the controller C (at a constant RMS voltage on the AC side). In this case, operating variables such as the duty cycle and/or the frequency (or similar operating parameters that affect the charging current) of the controllable switching elements are set within the power factor correction filter. The output current at the power factor correction filter and thus also the power transmitted to the rechargeable traction battery AK may be controlled by this manipulated variable. In an embodiment, the power factor correction filter delivers a charging current that follows a setpoint value as precisely as possible, which setpoint value originates, for example, from a rechargeable battery monitor that monitors the rechargeable traction battery AK.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle on-board electrical system, comprising:
   an AC voltage charging connection;
   a rechargeable traction battery;
   a power factor correction filter, which directly connects the AC voltage charging connection to the rechargeable traction battery; and
   a controller which is connected to the power factor correction filter in a driving manner;
   wherein the controller switches the power factor correction filter from a single-phase operation to a three-phase operation when a terminal voltage at the rechargeable traction battery reaches a minimum three-phase voltage.

2. The vehicle on-board electrical system of claim 1, wherein the rechargeable traction battery further comprising a high-voltage rechargeable battery.

3. The vehicle on-board electrical system of claim 1, wherein the power factor correction filter further comprising a step-down power factor correction filter.

4. The vehicle on-board electrical system of claim 1, at wherein least one of the power factor correction filter or the AC voltage connection further comprising a three-phase design.

5. The vehicle on-board electrical system of claim 1, wherein, at a three-phase input voltage with an RMS value of 230 V, the power factor correction filter delivers an adjustable charging current to the rechargeable traction battery at a DC voltage between a minimum voltage of at least 50 volts up to a maximum voltage of not more than 488V or 460V.

6. The vehicle on-board electrical system of claim 1, wherein the rechargeable traction battery further comprising a maximum operating voltage which is not greater than a maximum voltage of the power factor correction filter.

7. The vehicle on-board electrical system of claim 1, wherein the power factor correction filter further comprising a step-up power factor correction filter and as a Vienna filter.

8. The vehicle on-board electrical system of claim 1, wherein the power factor correction filter and the AC voltage connection further comprising a three-phase design, wherein the power factor correction filter is switched over between the single-phase operation and the three-phase operation, and during the single-phase operation or the three-phase operation a three-phase voltage is applied to the AC voltage connection.

9. The vehicle on-board electrical system of claim 1, wherein during the three-phase operation and at a three-phase input voltage with an RMS voltage of 230 V, the power factor correction filter delivers an adjustable charging current to the rechargeable traction battery at the minimum three-phase voltage of at least 563 V or 600V.

10. The vehicle on-board electrical system of claim 1, wherein during the single-phase operation and at an input voltage with an RMS value of 230 V, the power factor correction filter delivers an adjustable charging current to the rechargeable traction battery at a DC voltage between a minimum single-phase voltage of at least 325 V or 350 V and a maximum single-phase voltage which is at least as great as the minimum three-phase voltage.

11. The vehicle on-board electrical system of claim 1, wherein, at a minimum state of charge of not more than 10%, the rechargeable traction battery has an operating voltage which is greater than a minimum single-phase voltage of the power factor correction filter.

* * * * *